United States Patent Office 2,932,531
Patented Apr. 12, 1960

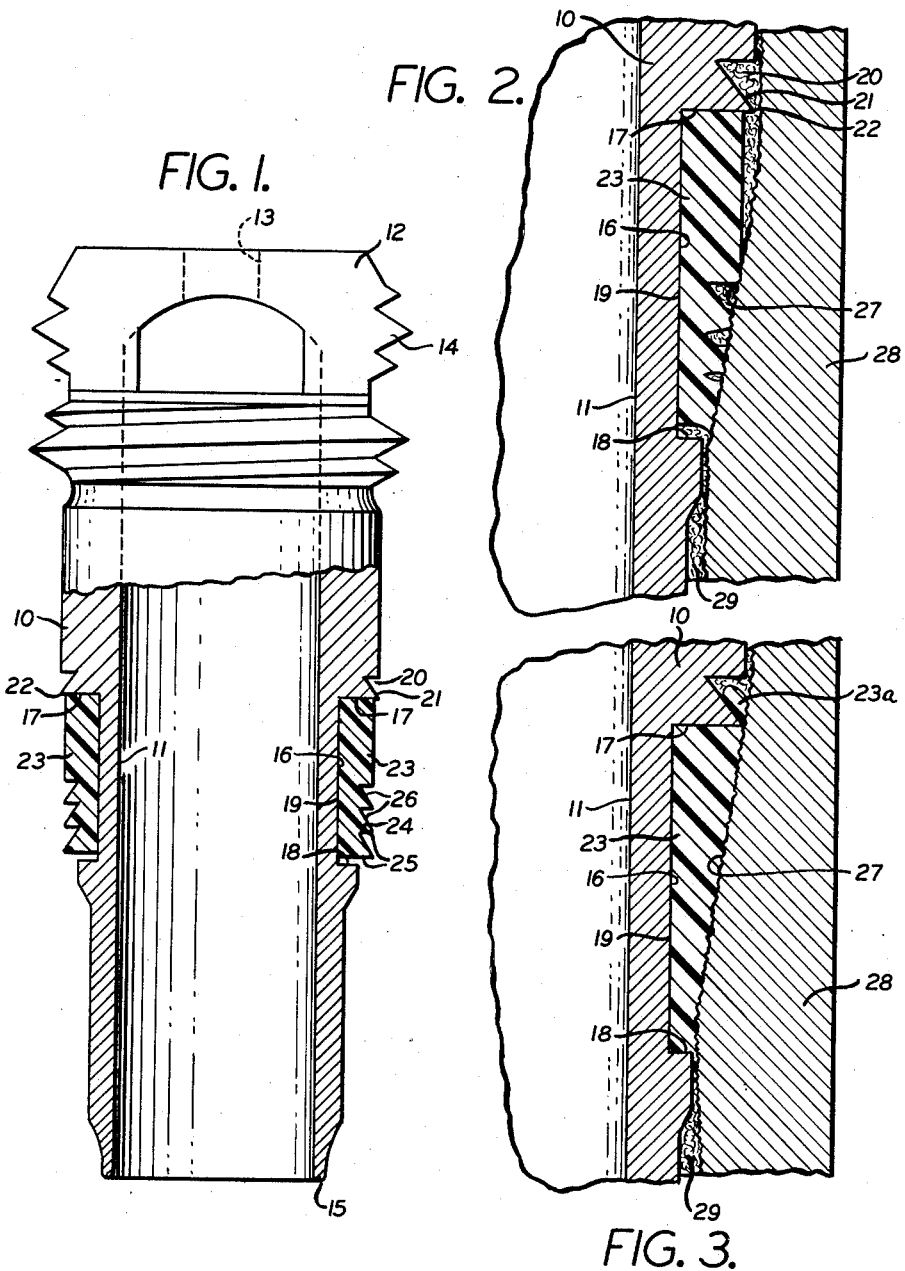

2,932,531

CHECK VALVE PLUG

Joseph Briechle, New Canaan, Conn., assignor to Scovill Manufacturing Company, Waterbury, Conn., a corporation of Connecticut Application June 13, 1956, Serial No. 591,152

3 Claims. (Cl. 285—110)

The present invention relates to valve cores for pneumatic tire valves and the like and aims to provide certain improvements therein.

Valve cores for fluid containers such as pneumatic tires and the like, usually comprise a tubular barrel or plug formed with an external annular groove within which a packing washer or gasket of rubber is vulcanized, the outer surface of the gasket being conical in form and adapted to seat tightly against a complemental shoulder or seat formed in a valve stem when the tubular plug is positioned within the valve stem by a screw-threaded part.

With the advent of rubber covered valve stems it was found necessary to chemically treat the valve stems to create a bond between the rubber cover and the metal stem. In treating the valve stem, the surfaces thereof become etched, including the internal tapered shoulder against which the valve core plug gasket must seat, and such etching of the internal tapered shoulder is not conducive for sealing purposes of the conventional plug rubber gasket for reasons that will presently appear.

In the conventional tire valve cores, the plug which carries the rubber gasket, is usually swiveled to a screw-threaded member which, when screwed into the valve stem, causes the gasket to become firmly pressed into the etched, tapered shoulder of the valve stem. A swivel is necessary to prevent tearing of the gasket during core insertion. A tightening torque of two-inch pounds is sufficient to insure a seal. If a tightening torque of about six-inch pounds is applied, the thin wall of the core plug distorts and leakage occurs. In this connection it must be remembered that automotive tire valve dimensions are standard the world over and cannot be changed and therefore limit the mechanical forces that can be applied to the various parts. Hence the wall thickness of the core cannot be increased since the outer diameter is fixed by the standard tire valve dimensions and the internal diameter cannot be decreased, since to do so will decrease the rate of air flow through the valve. The rate of air flow is important especially when large truck tires are to be inflated.

The conventional swivel connection between the valve plug and its screw-threaded member has one outstanding weakness, namely, that when such valve core is subjected to extreme heat conditions as encountered in modern jet aircraft landings, the rubber gasket on the valve plug will vulcanize itself to the valve stem. If removal of the core is necessary, the rubber gasket will either tear or the swivel connection will break, and either event will necessitate the use of special tools in cleaning out the remaining rubber or removing the core. Not only are such procedures time-consuming, but they cannot be tolerated from a military point of view. Such valve cores also are used in conduits for fluids which attack rubber with the resultant deleterious effects upon the fluid seal.

The present invention has among its objects: (1) to provide a valve core plug which will overcome the deficiencies inherent in conventional valve core plugs; (2) to provide a gasket for the valve core plug which is not adversely affected by temperatures from —90° F. to 500° F. or by fluids which attack rubber; (3) to provide a valve plug wherein the gasket will not stick or adhere to metal, yet will be securely held in place on the plug and provide an efficient fluid-tight seal between the plug and the valve stem when a tightening torque of two-inch pounds is applied thereto; and (4) to provide a valve plug wherein a swivel screw plug is unnecessary, wherein vulcanizing of the gasket to the plug is eliminated and hence simplifies and reduces the production cost of such plugs.

The foregoing and other objects of the invention not specifically enumerated are accomplished by mounting in the external annular groove of a valve plug a gasket formed of a fluoroethylene polymer resin, preferably the tetrafluoroethylene polymer which is known under the trade mark "Teflon." At least a portion of the outer periphery of the gasket which is intended to provide the fluid tight seal with the valve stem is formed with annular, saw tooth ribs, the peripheral portions of which are adapted to be deformed and firmly engaged by the etched surface of the valve stem so that the metal portion of the plug will rotate inside the Teflon plug as the valve core is screwed home within the valve stem.

The invention, which also embodies other features of novelty, will be better understood from the detailed description which follows, when considered in connection with the accompanying drawings showing a preferred embodiment, and wherein:

Figure 1 is an enlarged diametrical section through a valve core plug embodying the invention, part of said plug being shown in elevation.

Fig. 2 is a greatly enlarged fractional diametrical section of the plug and the cooperating part of a valve stem showing the manner in which the leak-tight seal is provided between the gasket and the etched internal seating shoulder of the valve stem under normal tightening torque.

Fig. 3 is a view similar to Fig. 2 showing the relationship of parts when excessive torque is applied to the valve core when mounted in a valve stem.

Referring first to Fig. 1 of the drawing, the valve core plug comprises a tubular body member 10 having a uniform bore 11 which is partially closed at its outer end by a flattened tool-engaging projection or bridge 12 having a central opening 13 therethrough for accommodating the pin of a valve check (not shown) for centering the valve check in said plug. At its outer end the tubular body is formed with external screw-threads 14 adapted for engagement with internal screw-threads in the mouth of the valve stem in which the valve core is to be mounted. At the inner or entering end of the plug, it is formed with a valve seat 15 for engagement with the valve check (not shown) of the core. The tubular body 10 intermediate its ends is formed with a primary annular external groove 16 having substantially flat end walls 17 and 18 and a cylindrical base wall 19. Adjacent the wall 17 the tubular body is formed with a second external annular groove 20, one end wall 21 of which intersects the peripheral edge of the wall 17 and provides therewith a relatively sharp edge 22. The shoulder 18 is of less radial width than the shoulder 17.

Mounted within the groove 16 is a packing washer or gasket 23 formed of a fluoroethylene polymer resin, preferably tetrafluoroethylene, commerically known under the trademark "Teflon." The gasket 23 is of generally annular cylindrical form and has an axial length slightly less than the axial length of the groove 16 and a radial dimension slightly less than the radial dimension of the wall 17 but greater than the wall 18 and is mounted in the groove by being forced over the entering end of the body 10. The gasket 23 adjacent the entering end of the plug is formed with a plurality of axially spaced, circumferentially extending ribs 24 which are preferably of saw-toothed shape in radial section, each rib having a flat face 25 and a conical face 26, the peripheral edges of the ribs lying within the peripheral contour of the gasket. The shape of the teeth is important in making a seal with the cooperating shoulder 27 on the valve stem 28 at normal tightening torque of two-inch pounds when the valve core is mounted within the valve stem. I have found that in making said teeth with an angle of approximately 55 degrees at the apex that the best results are obtainable under normal tightening torque applied to the valve core.

In Fig. 2 there is shown the relative relationship of parts of the body member 10 and gasket 23 when the valve core is inserted into a valve stem under a torque of approximately two-inch pounds. Valve stems are now usually chemically treated to promote the bond of a rubber cover and such treatment leaves the inner wall or bore of the valve stem etched, as shown greatly magnified by the roughened surface 29.

When the core of which the tubular body 10 is a part is screwed into the valve stem the tapered shoulder 27, upon being engaged by the saw-toothed ribs 24, deforms and firmly engages said ribs to hold the gasket against rotation while permitting rotation of the body 10 relative to the gasket until an air-tight seal is formed. Because of the relative rotation provided between the Teflon gasket and the metal tubular body, the need for a swivel connection between the plug and a screw-threaded member as is conventional in rubber-gasketed plugs, is eliminated. As the Teflon gasket does not stick or bond to metal even at elevated temperatures of the magnitude of 500° F., it will be appreciated that the core can be readily removed and reinserted without destroying the seal-providing surface of the gasket.

In Fig. 3 there is shown the relative relation of the Teflon gasket to the valve stem seating shoulder when an axcessive torque, say of six-inch pounds has been applied to the valve core when inserting the same. Under such conditions the gasket will be deformed to completely fill the annular groove 16 and may also overflow said groove beyond the shoulders 17 and 18. The overflow past shoulder 18 will be negligible but may be sufficient over shoulder 17 to impair the seating of the gasket upon removal and reinsertion of the plug into a valve stem if not taken care of. Such overflow as shown at 23a passes into the second annular groove 20, and is severed by the sharp edge 22 when it engages the tapered shoulder 27 and is retained in the groove 29.

From the foregoing detailed description it will be apparent that I have provided an improved and simplified valve core plug which possesses numerous advantages over the conventional rubber-gasketed plug, and while I have shown and described a preferred embodiment of the invention, it is to be understood that minor changes in details of construction may be made therein within the range of mechanical and engineering skill, without departing from the spirit of the invention as hereinafter claimed.

What I claim is:

1. A valve core for pneumatic tire valves and the like, comprising a rotatable tubular metal plug having means for threading it into a valve casing, said plug being formed with an external annular groove having a cylindrical base wall and end walls, one end of the plug being its entering end, a generally cylindrical tubular gasket mounted in said groove and snugly engaging the base wall thereof, said gasket being formed of a synthetic deformable resin which will remain physically and chemically stable within a temperature range from −90° F. to 500° F. and which will be free from adhering to the metal of the tubular plug, said gasket having a peripheral wall which extends radially beyond the end wall of the groove nearest the entering end of the plug and lies wholly within the end wall of the groove remote from the entering end of the plug, and said gasket having at least a portion of its axial length formed with axially spaced circumferentially extending ribs which are saw-toothed in radial section with the apices lying in the contour of the outer cylindrical wall of the gasket.

2. A valve core according to claim 1 wherein the axial length of the gasket is somewhat less than the axial length of the annular groove in the plug.

3. A valve core for pneumatic tire valves, comprising a tubular metal plug formed with a primary external annular groove and a secondary external annular groove, said grooves having end walls with the peripheral edges of the adjacent end walls of the grooves intersecting to provide a relatively sharp edge, one end of the plug being its entering end, said secondary groove being located farther rearwardly from the entering end than the primary groove, and a tubular gasket of synthetic deformable resin which is physically and chemically stable within a temperature range from −90° F. to 500° F. and which will be free from adhering to the metal of said primary groove, said gasket having a peripheral wall which normally does not extend beyond the sharp edge of the intersecting walls but which under pressure in contact with a seating surface may be deformed to extend beyond said relatively sharp edge and into said secondary groove.

References Cited in the file of this patent

UNITED STATES PATENTS

| | | |
|---|---|---|
| 1,187,154 | Kraft | June 13, 1916 |
| 1,438,081 | Allen | Dec. 5, 1922 |
| 1,564,270 | Phillips | Dec. 8, 1925 |
| 1,948,762 | Kirkpatrick | Feb. 27, 1934 |
| 2,021,745 | Pfefferle | Nov. 19, 1935 |
| 2,265,615 | Stalter | Dec. 9, 1941 |
| 2,271,777 | Nathan | Feb. 3, 1942 |
| 2,477,533 | Whiting | July 26, 1949 |
| 2,615,740 | Nathan | Oct. 28, 1952 |
| 2,735,645 | Freed | Feb. 21, 1956 |
| 2,769,667 | Spender | Nov. 6, 1956 |